Patented Feb. 16, 1954

2,669,566

UNITED STATES PATENT OFFICE 2,669,566

ESTERS OF ORGANIC CARBOXYLIC ACIDS

Quentin E. Thompson, St. Louis, Mo., assignor to Monsanto Chemical Company, St. Louis, Mo., a corporation of Delaware No Drawing. Application December 7, 1951,
Serial No. 260,566

12 Claims. (Cl. 260—293.4)

1

This invention relates to optically active 4, 4a,- 5,8-tetrahydro - 2 - alkoxy - 4a - methyl-4-oxo-1- naphthyl alkyl - 1 - piperidylsulfonylbenzoates. More specifically, this invention relates to optically active 4,4a,5,8 - tetrahydro - 2 - alkoxy-4a- methyl-4-oxo-1-naphthyl alkyl - 1 - piperidylsulfonylbenzoates having the formula

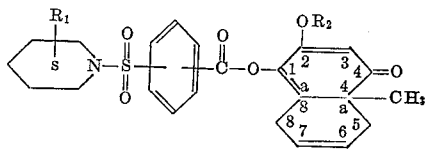

wherein $R_1$ and $R_2$ represent alkyl radicals containing from 1 to 5 carbon atoms, and to a method for their preparation. The letter "s" in the structural formula indicates a saturated ring structure.

The novel compounds of this invention are exceptionally useful intermediates for the preparation of various organic compounds, particularly pharmaceuticals. These esters are exceptionally useful intermediates for the preparation of steroids. They may be conveniently prepared by reacting an optically active alkyl-1-piperidylsulfonylbenzoyl halide, wherein the alkyl group contains from 1 to 5 carbon atoms and a 5,8-dihydro - 4 - hydroxy - 3 - alkoxy - 8a - methyl-1- (8aH)-naphthalenone, alkali metal or alkaline earth metal salt, wherein the alkoxy group contains from 1 to 5 carbon atoms. These latter salts may be represented by the following formula

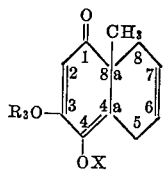

wherein R represents an alkyl radical containing from 1 to 5 carbon atoms and X represents an alkali metal or an alkaline earth metal. It will be obvious to those skilled in the art that the 5,8-dihydro - 4 - hydroxy - 3 - alkoxy-8a-methyl- 1(8aH)-naphthalenone, alkali metal and alkaline earth metal salts, contain an asymmetric carbon atom. As a result thereof, the compounds exist in two optically active forms, namely, the dextrorotary (d) and levo-rotary (l), and both forms and mixtures thereof are contemplated by this invention and may be utilized to prepare the correspondingly optically active esters of this invention.

Similarly, the 2-alkyl-1-piperidylsulfonylben-

2 zoyl halide and the 3-alkyl-1-piperidylsulfonylbenzoyl halides contain one asymmetric carbon atom. These optically active acid halides, therefore, also exist in both the d and l forms and both optically active isomers may be used to prepare the correspondingly optically active esters of this invention. 4-alkyl-1-piperidylsulfonylbenzoyl halides, are optically inactive.

The following examples are illustrative, but not limitative, of the novel esters of this invention:

Example I 5.70 g. of dl-5,8-dihydro-4-hydroxy-3-methoxy-8a-methyl-1(8aH)-naphthalenone, sodium salt, is suspended in 100 ml. of dry dioxane at 100° C. 7.54 g. of d-p-(2-methyl-1-piperidylsulfonyl)benzoyl chloride is added and the suspension refluxed for about five minutes. About 70 ml. of dioxane is then distilled from the reaction mixture under reduced pressure and the residue remaining poured into 250 ml. of water, thereby precipitating the solid ester. The solid ester is recovered, dried immediately, and purified by recrystallizing once from a mixture of acetone and diisopropyl ether, giving a substantially pure mixture of diastereoisomeric 4,4a,5,8-tetrahydro-2- methoxy-4a-methyl - 4 - oxo - 1 - naphthyl p-(2- methyl-1-piperidylsulfonyl)benzoate esters having the following analysis:

Melting point about 175–181° C.
Optical rotation $[\alpha]_D^{25°} = +19° \pm 1°$ (c=2, chloroform)

| | Sulfur |
|---|---|
| Calculated for $C_{25}H_{29}O_6NS$ | 6.80 |
| Found | 6.90 |

Example II

In accordance with the procedure described in Example I, substantially pure 4,4a,5,8-tetrahydro- 2-ethoxy-4a-methyl - 4 - oxo - 1 - naphthyl o-(3- ethyl - 1 - piperidylsulfonyl)benzoate is obtained utilizing the following reactants:

6.46 g. of dl-5,8-dihydro-4-hydroxy-3-ethoxy-8a- methyl-1(8aH)-naphthalenone, potassium salt
7.54 g. of l-o-(3-ethyl-1-piperidylsulfonyl)benzoyl chloride

Example III 5.70 g. of dl-5,8-dihydro-4-hydroxy-3-methoxy-8a-methyl-1(8aH)-naphthalenone, sodium salt, is suspended in 100 ml. of dry dioxane at 100° C. 7.54 g. of l-p-(2-methyl-1-piperidylsulfonyl)benzoyl chloride is added and the suspension refluxed for about five minutes. About 70 ml. of dioxane is then distilled from the reaction mixture under reduced pressure and the residue remaining poured into 250 ml. of water, thereby precipitating the solid ester. The solid ester is recovered, dried immediately, and purified by recrystallizing once from a mixture of acetone and diisopropyl ether, giving a substantially pure mixture of diastereoisomeric 4,4a,5,8-tetrahydro-2-methoxy-4a-methyl-4-oxo-1-naphthyl p-(2-methyl-1-piperidylsulfonyl)benzoate esters having the following properties:

Melting point, 175–181° C.
Optical rotation $[\alpha]_D^{25°} = -19° \pm 1°$ (c=2, chloroform)

Example IV

In accordance with the procedure described in Example I, substantially pure 4,4a,5,8-tetrahydro-2-pentoxy-4a-methyl-4-oxo-1-naphthyl m-(4-propyl-1-piperidylsulfonyl)benzoate is obtained utilizing the following reactants:

7.04 g. of *l*-5,8-dihydro-4-hydroxy-3-pentoxy-8a-methyl-1(8aH)-naphthalenone, calcium salt
9.36 g. of m-(4-propyl-1-piperidylsulfonyl)benzoyl bromide

Example V

In accordance with the procedure described in Example I, substantially pure 4,4a,5,8-tetrahydro-2-ethoxy-4a-methyl-4-oxo-1-naphthyl p-(2-methyl-1-piperidylsulfonyl)benzoate is obtained utilizing the following reactants:

6.05 g. of *dl*-5,8-dihydro-4-hydroxy-3-ethoxy-8a-methyl-1(8aH)-naphthalenone, sodium salt
7.54 g. of *d*-p-(2-methyl-1-piperidylsulfonyl)benzoyl chloride

Example VI

In accordance with the procedure described in Example I, substantially pure 4,4a,5,8-tetrahydro-2-propoxy-4a-methyl-4-oxo-1-naphthyl p-(2-methyl-1-piperidylsulfonyl)benzoate is obtained utilizing the following reactants:

6.41 g. of *dl*-5,8-dihydro-4-hydroxy-3-propoxy-8a-methyl-1(8aH)-naphthalenone, sodium salt
7.54 g. of *d*-p-(2-methyl-1-piperidylsulfonyl)benzoyl chloride

Example VII

In accordance with the procedure described in Example I, substantially pure 4,4a,5,8-tetrahydro-2-butoxy-4a-methyl-4-oxo-1-naphthyl p-(2-methyl-1-piperidylsulfonyl)benzoate is obtained utilizing the following reactants:

6.76 g. of *dl*-5,8-dihydro-4-hydroxy-3-butoxy-8a-methyl-1(8aH)-naphthalenone, sodium salt
7.54 g. of *d*-p-(2-methyl-1-piperidylsulfonyl)benzoyl chloride

Example VIII

In accordance with the procedure described in Example I, substantially pure 4,4a,5,8-tetrahydro-2-pentoxy-4a-methyl-4-oxo-1-naphthyl p-(2-methyl-1-piperidylsulfonyl)benzoate is obtained utilizing the following reactants:

7.12 g. of *dl*-5,8-dihydro-4-hydroxy-3-pentoxy-8a-methyl-1(8aH)-naphthalenone, sodium salt
7.54 g. of *d*-p-(2-methyl-1-piperidylsulfonyl)benzoyl chloride While the preceding examples have illustrated specific embodiments of this invention, substantial variation is possible in the quantities of reactants, reaction conditions, etc., without departing from the scope of this invention. For example, while approximately equivalent proportions of the reactants are preferred, an excess of either of these reactants may be utilized, if desired.

The reaction may be carried out in any inert reaction medium. For example, the reaction may be carried out in dioxane, lower alkyl ethers, benzene, toluene, xylenes, etc.

The reaction may also be carried out over a substantial temperature range. Reaction temperatures ranging from the freezing point of the reaction mixture to the boiling point of the reaction mixture may be utilized. Preferably, the reaction is carried out at a temperature in the range of from about 15° C. to about 110° C.

The 5,8-dihydro-4-hydroxy-3-alkoxy-8a-methyl-1(8aH)-naphthalenone, alkali metal and alkaline earth metal salts, utilized in this invention are described and claimed in my copending application Serial No. 253,554, filed October 27, 1951. The optically active (alkyl-1-piperidylsulfonyl)benzoyl halides utilized in this invention are described and claimed in my copending application Serial No. 260,568, filed December 7, 1951.

What is claimed is:

1. As new chemical compounds, optically active 4,4a,5,8-tetrahydro-2-alkoxy-4a-methyl-4-oxo-1-naphthyl alkyl-1-piperidylsulfonyl-benzoates having the formula wherein $R_1$ and $R_2$ represent alkyl radicals containing from 1 to 5 carbon atoms and wherein the alkyl-1-piperidylsulfonyl radical is selected from the group consisting of 2-alkyl-1-piperidylsulfonyl and 3-alkyl-1-piperidylsulfonyl radicals.

2. As a new chemical compound, optically active 4,4a,5,8-tetrahydro-2-methoxy-4a-methyl-4-oxo-1-naphthyl p-(2-methyl-1-piperidylsulfonyl)benzoate.

3. As a new chemical compound, optically active 4,4a,5,8-tetrahydro-2-ethoxy-4a-methyl-4-oxo-1-naphthyl p-(2-methyl-1-piperidylsulfonyl)benzoate.

4. As a new chemical compound, optically active 4,4a,5,8-tetrahydro-2-propoxy-4a-methyl-4-oxo-1-naphthyl p-(2-methyl-1-piperidylsulfonyl)benzoate.

5. As a new chemical compound, optically active 4,4a,5,8-tetrahydro-2-butoxy-4a-methyl-4-oxo-1-naphthyl p-(2-methyl-1-piperidylsulfonyl)benzoate.

6. As a new chemical compound, optically active 4,4a,5,8-tetrahydro-2-pentoxy-4a-methyl-4-oxo-1-naphthyl p-(2-methyl-1-piperidylsulfonyl)benzoate.

7. A process for the preparation of optically active 4,4a,5,8-tetrahydro-2-alkoxy-4a-methyl-4-oxo-1-naphthyl alkyl-1-piperidylsulfonylbenzoates having the formula wherein $R_1$ and $R_2$ represent alkyl radicals containing from 1 to 5 carbon atoms and wherein the alkyl-1-piperidylsulfonyl radical is selected from the group consisting of 2-alkyl-1-piperidylsulfonyl and 3-alkyl-1-piperidylsulfonyl radicals, which comprises reacting a compound selected from the group consisting of 5,8-dihydro-4-hydroxy - 3-alkoxy-8a-methyl-1(8aH)-naphthalenone, alkali metal and alkaline earth metal salts, wherein the alkoxy group contains from 1 to 5 carbon atoms, and an optically active alkyl-1-piperidylsulfonylbenzoyl halide selected from the group consisting of 2-alkyl-1-piperidylsulfonylbenzoyl halides and 3-alkyl-1-piperidylsulfonylbenzoyl halides, wherein the alkyl group contains from 1 to 5 carbon atoms.

8. A process for the preparation of optically active 4,4a, 5, 8-tetrahydro-2-methoxy-4a-methyl-4-oxo-1-naphthyl p-(2-methyl - 1 - piperidylsulfonyl)benzoate, which comprises reacting 5,8-dihydro - 4 - hydroxy - 3 - methoxy-8a-methyl-1(8aH)-naphthalenone, sodium salt, and optically active p-(2 - methyl-1-piperidylsulfonyl)benzoyl chloride.

9. A process for the preparation of optically active 4,4a,5,8 - tetrahydro-2-ethoxy-4a-methyl-4 - oxo - 1 - naphthyl p-(2 - methyl-1-piperidylsulfonyl)benzoate, which comprises reacting 5,8-dihydro - 4 - hydroxy - 3 - ethoxy - 8a - methyl-1(8aH)-naphthalenone, sodium salt, and optically active p-(2 - methyl-1-piperidylsulfonyl)benzoyl chloride.

10. A process for the preparation of optically active 4,4a,5,8 - tetrahydro - 2 - propoxy - 4a-methyl - 4 - oxo - 1 - naphthyl p - (2 - methyl-1-piperidylsulfonyl)benzoate, which comprises reacting 5,8 - dihydro - 4 - hydroxy - 3 - propoxy-8a-methyl-1(8aH)-naphthalenone, sodium salt, and optically active p-(2 - methyl - 1 - piperidylsulfonyl)benzoyl chloride.

11. A process for the preparation of optically active 4,4a,5,8 - tetrahydro - 2 - butoxy - 4a-methyl - 4 - oxo - 1 - naphthyl p-(2 - methyl-1-piperidylsulfonyl)benzoate, which comprises reacting 5,8 - dihydro - 4 - hydroxy - 3 - butoxy-8a - methyl - 1(8aH) - naphthalenone, sodium salt, and optically active p-(2-methyl-1-piperidylsulfonyl)benzoyl chloride.

12. A process for the preparation of optically active 4,4a,5,8 - tetrahydro - 2 - pentoxy - 4a-methyl - 4 - oxo - 1 - naphthyl p-(2 - methyl - 1-piperidylsulfonyl)benzoate, which comprises reacting 5,8 - dihydro - 4 - hydroxy - 3 - pentoxy-8a - methyl - 1(8aH) - naphthalenone, sodium salt, and optically active p-(2-methyl-1-piperidylsulfonyl)benzoyl chloride.

QUENTIN E. THOMPSON.

References Cited in the file of this patent

UNITED STATES PATENTS

| Number | Name | Date |
| --- | --- | --- |
| 2,506,023 | Jenny et al. | May 2, 1950 |
| 2,506,024 | Jenny et al. | May 2, 1950 |
| 2,506,025 | Jenny et al. | May 2, 1950 |